US009185595B2

(12) United States Patent
Qu

(10) Patent No.: US 9,185,595 B2
(45) Date of Patent: Nov. 10, 2015

(54) METHOD, APPARATUS AND SYSTEM FOR MOVING WIRELESS TERMINALS IN MOBILITY MANAGEMENT SERVING NODE POOL

(75) Inventor: Zhiwei Qu, Shanghai (CN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/236,575

(22) PCT Filed: Aug. 1, 2011

(86) PCT No.: PCT/CN2011/001255
§ 371 (c)(1),
(2), (4) Date: Jan. 31, 2014

(87) PCT Pub. No.: WO2013/016842
PCT Pub. Date: Feb. 7, 2013

(65) Prior Publication Data
US 2014/0160938 A1   Jun. 12, 2014

(51) Int. Cl.
*H04W 36/00* (2009.01)
*H04W 28/02* (2009.01)
(Continued)

(52) U.S. Cl.
CPC ......... *H04W 28/0247* (2013.01); *H04L 47/125* (2013.01); *H04W 8/065* (2013.01);
(Continued)

(58) Field of Classification Search
CPC ... H04W 8/065; H04W 8/14; H04W 28/0247; H04W 24/04; H04W 88/14; H04W 48/17; H04W 36/00; H04W 36/0005; H04W 36/0033; H04W 36/0038; H04W 36/0044; H04W 36/36; H04W 36/38; H04W 12/06; H04W 92/22; H04W 48/20; H04W 28/0226; H04W 52/285; H04W 36/0011; H04W 47/125; H04W 28/08; H04W 92/24; H04L 63/0892
USPC ................. 370/236, 338, 331–334, 384, 230; 455/436–444; 709/225
See application file for complete search history.

(56) References Cited

U.S. PATENT DOCUMENTS

2011/0238834 A1* 9/2011 Nair et al. ...................... 709/225
2012/0170548 A1* 7/2012 Rajagopalan et al. ......... 370/331

FOREIGN PATENT DOCUMENTS

CN      101039506 A    9/2007
CN      101562847 A    10/2009
(Continued)

OTHER PUBLICATIONS

Extended European Search Report dated Mar. 5, 2015, issued in European Patent Application No. 11870285.1, 7 pages.
(Continued)

Primary Examiner — Edan Orgad
Assistant Examiner — Ivan O Latorre
(74) Attorney, Agent, or Firm — Rothwell, Figg, Ernst & Manbeck, P.C.

(57) ABSTRACT

The invention discloses a method for moving a wireless terminal in a mobility management serving node pool comprising at least a source mobility management serving node and a target mobility management serving node, comprising: initiating, from the source mobility management serving node, a first subscriber context procedure to inform the target mobility management serving node of a move action for the wireless terminal; launching, from the target mobility management serving node, a second subscriber context procedure to obtain a subscriber context for the wireless terminal from the source mobility management serving node, in response to the informing; and establishing a connection between a radio access node for the wireless terminal and a session management gateway node via the target mobility management serving node. An apparatus and a system are also disclosed for the same. With the solution, control plane and user plane traffic for the wireless terminal may be moved with a minimum of payload loss.

23 Claims, 5 Drawing Sheets

(51) Int. Cl.
  *H04L 12/803* (2013.01)
  *H04W 8/06* (2009.01)
  *H04W 24/04* (2009.01)
  *H04W 88/14* (2009.01)
  *H04W 48/00* (2009.01)
  *H04W 28/08* (2009.01)
  *H04W 92/24* (2009.01)

(52) U.S. Cl.
  CPC ......... *H04W 24/04* (2013.01); *H04W 36/0011* (2013.01); *H04W 36/0033* (2013.01); *H04W 28/08* (2013.01); *H04W 48/17* (2013.01); *H04W 88/14* (2013.01); *H04W 92/24* (2013.01)

(56) References Cited

FOREIGN PATENT DOCUMENTS

| CN | 101583155 | * | 11/2009 | ............ H04W 28/08 |
| CN | 101583155 | A | 11/2009 | |
| CN | WO2010/111814 | * | 10/2010 | ............ H04W 36/00 |
| WO | 2010112037 | A1 | 10/2010 | |

OTHER PUBLICATIONS

Nortel, "Handover to offload MME" 3GPP TSG SA WG2 Meeting #64, TD S2-082681, 2008, 5 pages.

* cited by examiner

METHOD, APPARATUS AND SYSTEM FOR MOVING WIRELESS TERMINALS IN MOBILITY MANAGEMENT SERVING NODE POOL

CROSS REFERENCE TO RELATED APPLICATION(S)

This application is a 35 U.S.C. §371 National Phase Entry Application from PCT/CN2011/001255, filed Aug. 1, 2011, designating the United States, the disclosure of which is incorporated herein in its entirety by reference.

TECHNICAL FIELD

The invention generally relates to radio communications, particularly to a method, an apparatus, a system for moving wireless terminals in a mobility management serving node pool.

BACKGROUND

The mobility management serving node pool, such as a Serving GPRS Support Node (SGSN) pool, a Mobility Management Entity (MME) pool, is to provide network redundancy for failure handling, planned maintenance without service downtime, easy network expansion, reduced network signaling load, a higher capacity usage ratio and load re-distribution within the pool.

When re-balancing a pool, e.g. in order to (re)-populate a node taken into service, it is necessary to get an even distribution of moved subscribers with respect to end-user behavior. This is essential not to create a skewed distribution within the pool and as a consequence subscribers running payload should be possible to move. The load re-balancing may off-load part of or all the subscribers.

During moving operations, the pool node (such as a SGSN in the SGSN pool, or a MME in the MME pool) may offload its subscribers with minimal impacts on the network and users, e.g., the pool node should avoid offloading only the low activity users while retaining the high activity subscribers. Gradual rather than sudden off-loading should be performed as a sudden re-balance of a large number of subscribers may overload other pool nodes in the pool. With minimal impact on network and the user's experience, the pool node should be off-loaded as soon as possible.

Conventionally moving subscribers within the mobility management serving node pool (SGSN or MME pool) is only possible by using a detach/reattach procedure (with a reattach flag) or by using the Routing Area Update (RAU)/Tracking Area Update (TAU) procedure which is stipulated by 3$^{rd}$ Generation Partnership Project (3GPP).

Nonetheless, this results in a drawback for the end-user that significant interruption/loss of payload would possibly happen.

Additionally, eNodeBs may have their load balancing parameters adjusted beforehand (e.g. the Weight Factor is set to zero if all subscribers are to be removed from one MME, then new entrants into the pool area will be routed to other MMEs). The MME initiates a S1 Release procedure with a release cause "load balancing TAU required". The S1 and RRC connections are released and the UE initiates a TAU but does not provide registered MME information to eNodeB in the RRC establishment, thus the eNodeB has to select an MME based on the Weight Factors of the MMEs in the pool.

This causes another problem that when re-balancing the MME pool, the re-balance is still dependant of eNodeB Load Balancing factor. It can not secure that the re-balance result is what is intended to achieve.

To this end, an improved procedure of moving subscribers within a mobility management serving node pool for addressing at least one of the above problems, such as without significant service interruption/loss and/or securing the re-balance effect, is therefore highly desired.

SUMMARY

An objective of the invention is to propose a solution for "seamlessly" moving active subscribers (e.g., subscribers running payload) from a source mobility management serving node (e.g., a source SGSN or a source MME) to a target mobility management serving node (e.g., a target SGSN or a target MME) within the mobility management serving node pool, i.e. the subscribers will be moved without significantly interruption of the payload and/or without significant payload loss.

In a first aspect of the invention, there is provided a method for moving a wireless terminal in a mobility management serving node pool comprising at least a source mobility management serving node and a target mobility management serving node, comprising: initiating, from the source mobility management serving node, a first subscriber context procedure to inform the target mobility management serving node of a move action for the wireless terminal; launching, from the target mobility management serving node, a second subscriber context procedure to obtain a subscriber context for the wireless terminal from the source mobility management serving node, in response to the informing; and establishing a connection between a radio access node for the wireless terminal and a session management gateway node via the target mobility management serving node.

In a second aspect of the invention, there is provided a computer-implemented apparatus for moving a wireless terminal in a mobility management serving node pool comprising a source mobility management serving node and a target mobility management serving node, comprising: a processing module for initiating, from the source mobility management serving node, a first subscriber context procedure to inform the target mobility management serving node of a move action for the wireless terminal; and for launching, from the target mobility management serving node, a second subscriber context procedure to the source mobility management serving node to obtain a subscriber context for the wireless terminal, in response to the informing; and a connection module for establishing a connection between a radio access node for the wireless terminal and a session management gateway node via the target mobility management serving node.

In a third aspect of the invention, there is provided a system moving a wireless terminal in a mobility management serving node pool comprising a source mobility management serving node and a target mobility management serving node, comprising: the wireless terminal; a radio access node for connecting the wireless terminal to the mobility management serving node pool; the source mobility management serving node for initiating a first subscriber context procedure to inform the target mobility management serving node of a move action for the wireless terminal; the target mobility management serving node for launching a second subscriber context procedure to the source mobility management serving node for requesting for mobility management context and session management context, in response to the informing;

and a session management gateway node for providing packet data connection as the gateway for the wireless terminal.

In a fourth aspect of the invention, a computer readable medium comprises a computer program product according to the invention.

By using SGSN/MME context procedure two times, source mobility management serving node and target mobility management serving node send different messages and wait for different responses, thus they can know the progress of move operation each other when exchanging the GPRS Tunneling Protocol (GTP) messages. The solution will improve the end user's mobile broadband experience tremendously and satisfy the operator's needs (such as load redistribution, SGSN/MME upgrade in pool, SGSN/MME replacement in pool etc).

BRIEF DESCRIPTION OF THE DRAWINGS

The features and advantages of the invention will be more apparent from the following exemplary embodiments of the invention with reference to the accompanied drawings, in which.

DETAILED DESCRIPTION

Figure 1:
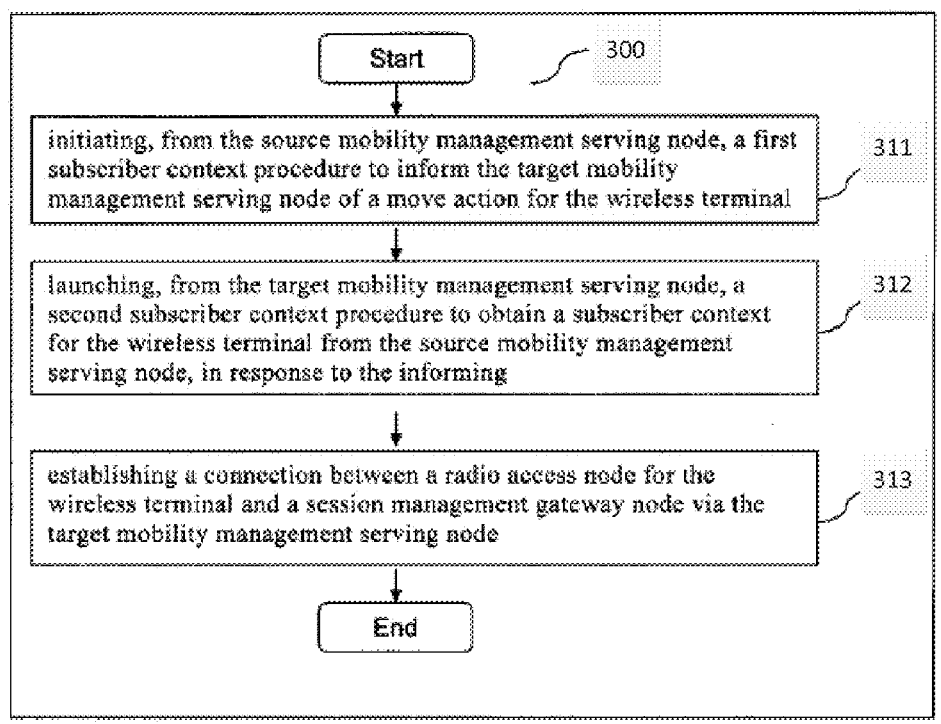
FIG. 1 shows a schematic flowchart diagram for a method moving a wireless terminal in a mobility management serving node pool according to an embodiment of the present invention.

Embodiments of the invention will be described more fully hereinafter with reference to the accompanied drawings. It will be apparent to those skilled in the art that the invention may, however, be embodied in many different forms and should not be construed as limited to the embodiments and specific details set forth herein. Like numbers refer to like elements throughout the description.

In this disclosure, although terminologies from WCDMA, GSM, 3GPP LTE have been used to exemplify the invention, this should not be seen as limiting the scope of the invention to only the aforementioned system. Other wireless systems may also benefit from exploiting the concept covered within this disclosure. Given the rapid development in communications, there will of course also be future type wireless communications systems with which the present invention may be embodied.

It is also to be noted that, in the context of the present invention, the terms, "subscriber" and "terminal", "MS", "UE" are all used to refer to a wireless terminal device in various wireless communication systems.

As known to an ordinary skill in the art, move of the wireless terminal (i.e., MS/UE) in the mobility management serving node pool is implemented in a different scenario if compared with Serving Radio Network Subsystem (SRNS) relocation, Packet Switched (PS) handover, or X2-based handover, S1-based handover. In the latter, radio connection (e.g., Radio Access Bearer (RAB) for Iu mode, and Evolved Radio Access Bearer (eRAB) for S1 mode) is kept between the target mobility management serving node (e.g., SGSN/MME) and the target Radio Access Network node (e.g., RNC/BSC/eNodeB), and between the source mobility management serving node (e.g., SGSN/MME) and the source Radio Access Network node (e.g., RNC/BSC/eNodeB) at the same time for data transferring.

However, in the scenario of move action of the wireless terminal, the source Radio Access Network node (e.g., RNC/BSC/eNodeB) and target Radio Access Network node (e.g., RNC/BSC/eNodeB) is the same one which can not hold two radio connections for one UE to the mobility management serving node (e.g., SGSN/MME) at the same time. Hence, the radio connection is interrupted at the moment when switching the radio link from the source mobility management serving node to the target mobility management serving node in move operation. This move operation is also applied in the prior Inter-SGSN/MME RAU/TAU procedure where the wireless terminal shall hold the PDP contexts or EPS bearer contexts.

Between the mobility management serving nodes (e.g., SGSN/MMEs), the mainly used GPRS Tunneling Protocol (GTP) messages are Context Procedure and Forward Relocation Procedure. However, the context procedure is started by the target (new) mobility management serving node which usually is unaware of the need to move the wireless terminal's contexts.

According to an embodiment of the invention, the source mobility management serving node (e.g., source SGSN/MME) initiates another context procedure to indicate the target mobility management serving node (e.g., source SGSN/MME) that a move operation for the wireless terminal will follow up. Herein, a new context procedure is used to launch the move procedure from the source mobility management serving node (e.g., SGSN/MME) because there is three-time handshake scheme to guarantee the move operation indication exchange between the source and target mobility management serving nodes (e.g., SGSN/MMEs). That is, the context procedure is used twice to implement the move operation from the source mobility management serving node (e.g., SGSN/MME) to the target mobility management serving node (e.g., SGSN/MME).

FIG. 1 shows a schematic flowchart diagram for a method 300 moving a wireless terminal 201 (e.g., MS/UE) in a mobility management serving node pool 206 (e.g., SGSN pool/MME pool) according to an embodiment of the present invention. To be clear, the related components in the method are illustrated in connection with the reference signs in FIG. 6.

In the embodiment, the wireless terminal 201 (e.g., MS/UE) may indicate a terminal referred to as "MS" in GSM system and/or referred to as "UE" in a WCDMA or LTE system. The mobility management serving node pool 206 may include a SGSN pool for a WCDMA system or a GSM system, or it may also include a MME pool for an LTE system. At least a source mobility management serving node 203 and a target mobility management serving node 204 may be included in the mobility management serving node pool 206. For the WCDMA system or GSM system, the source mobility management serving node 203 may refer to a source SGSN, the target mobility management serving node 204 may refer to a target SGSN, the session management gateway node may refer to a Gateway GPRS Support Node (GGSN). For the LTE system, the source mobility management serving node 203 may refer to a source MME, the target mobility management serving node 204 may refer to a target MME, the session management gateway node 205 may refer to a Serving Gateway (S-GW)/PDN Gateway (P-GW). The radio access node 202 may refer to a Radio Network Controller (RNC) node in the WCDMA system, it may also refer to a Base Station Controller (BSC) node in the GSM system, or an eNodeB in the LTE system.

The method 300 for moving a wireless terminal 201 (e.g., MS/UE) in a mobility management serving node pool 206 (e.g., SGSN pool/MME pool) may include the following steps:

At step 311, the source mobility management serving node 203 (e.g., source SGSN/MME) initiates a subscriber context procedure to inform the target mobility management serving node 204 (e.g., target SGSN/MME) of a move action for the wireless terminal 201 (e.g., MS/UE).

The terms, "subscriber context procedure" generally has the same meaning with the term "context procedure" in the context. The move action means a wireless terminal is arranged to be moved from the source mobility management serving node 203 (e.g., source SGSN/MME) to the target mobility management serving node 204 (e.g., target SGSN/MME).

In an embodiment, the subscriber context procedure particularly may include the following steps. A request from the source mobility management serving node 203 (e.g., source SGSN/MME) is sent to the target mobility management serving node 204 (e.g., target SGSN/MME). The request contains at least a move indicator, a subscriber permanent identity (e.g., International Mobile Subscriber Identity (IMSI)), and a serving radio access node identity (e.g., RNC ID) or location information (e.g. RAI/TAI). Then, a response containing at least a new subscriber temporary identity (e.g., P-TMSI/GUTI) assigned for the wireless terminal 201 to be moved and the move indicator is received from the target mobility management serving node 204 (e.g., target SGSN/MME). An Acknowledgement containing at least the move indicator is returned to the target mobility management serving node 204 (e.g., target SGSN/MME).

In the embodiment, before returning the Acknowledgement, the source mobility management serving node 203 (e.g., source SGSN/MME) allocates the new subscriber temporary identity to the wireless terminal 201 (e.g., MS/UE) and receives a response indicating the new subscriber temporary identity allocation completes from the wireless terminal 201 (e.g., MS/UE).

At step 312, in response to the informing by the source mobility management serving node 203 (e.g. source SGSN/MME), the target mobility management serving node 204 (e.g., target SGSN/MME) launches another subscriber context procedure to obtain a subscriber context for the wireless terminal 201 (e.g., MS/UE) from the source mobility management serving node 203 (e.g. source SGSN/MME).

For the WCDMA system and GSM system, the subscriber context may include a Mobility Management context, and Packet Data Protocol (PDP) context(s) if exists. For the LTE system, the subscriber context may include a mobility management context and an Evolved Packet System (EPS) context.

In an embodiment, the another subscriber context procedure further includes the following steps. A request for the subscriber context is sent from the target mobility management serving node 204 (e.g., target SGSN/MME) to the source mobility management serving node 203 (e.g., source SGSN/MME). Then, the subscriber context containing a mobility management context and, a session management context if exists, for the wireless terminal is transferred from the source mobility management serving node 203 (e.g., source SGSN/MME) to the target mobility management serving node 204 (e.g., target SGSN/MME). An Acknowledgement is subsequently returned to the source mobility management serving node 203 (e.g., source SGSN/MME).

In the embodiment, before returning the Acknowledgement, if the session management context exists, a request for updating the session management context is sent from the target mobility management serving node 204 (e.g., target SGSN/MME) to the session management gateway node 205 (e.g., GGSN/S-GW, P-GW), and a response indicating completion of the update is received from the session management gateway node 205 (e.g., GGSN/S-GW, P-GW).

At step 313, a connection between a radio access node 202 (e.g., RNC/BSC/eNodeB) for the wireless terminal 201 (e.g., MS/UE) and a session management gateway node 205 (e.g., GGSN/S-GW, P-GW) is established via the target mobility management serving node 204 (e.g., target SGSN/MME).

The connection to be established in this step may include a radio connection between the target mobility management serving node 204 and the radio access node 202 for the wireless terminal 201, and a session connection between the target mobility management serving node 204 and the session management gateway node 205.

In an embodiment, the target mobility management serving node 204 (e.g., target SGSN/MME) further initiates an update location procedure to notify HLR/HSS the wireless terminal 201 (e.g., MS/UE) moved from the source mobility management serving node 203 (e.g., source SGSN/MME) to the target mobility management serving node 204 (e.g., target SGSN/MME).

For the WCDMA system and the LTE system, the radio connection between the source mobility management serving node 203 (e.g., source SGSN/MME) and the radio access node 202 (e.g., RNC/BSC/eNodeB) is released.

The radio access node 202 (e.g., RNC/BSC/eNodeB) holds only one radio link from the wireless terminal 201 (e.g., MS/UE) to be moved either to the source mobility management serving node 203 (e.g., source SGSN/MME) or to the target mobility management serving node 204 (e.g., target SGSN/MME) at the same time.

According to the method described above, the target mobility management serving node 204 (e.g., target SGSN/MME) takes over the connection with the session management gateway node 205 (e.g., GGSN/S-GW, P-GW) from the source mobility management serving node 203 (e.g., source SGSN/MME) and re-establishes the radio-connection with the radio access node 202 (e.g., RNC/BSC/eNodeB). As a result, downlink data packets from the session management gateway node 205 (e.g., GGSN/S-GW, P-GW) may be directed towards the wireless terminal 201 (e.g., MS/UE) via the target mobility management serving node 204 (e.g., target SGSN/MME) instead of via the original source mobility management serving node 203 (e.g., source SGSN/MME); vice versa, uplink data packets from the wireless terminal 201 (e.g., MS/UE) may be directed towards the session management gateway node 205 (e.g., GGSN/S-GW, P-GW) via the target mobility management serving node 204 (e.g., target SGSN/MME).

According to the method in the embodiment of the invention, the control plane and user plane traffic for the wireless terminal may be moved with a minimum of payload loss. Also, the individual components (such as the wireless terminals, base stations) can be put together in a way without a change of the legacy behavior. Also, there is no any change in the Radio Access Network node (RNC/BSC/eNodeB) thus making the solution vendor independent.

Figure 2:
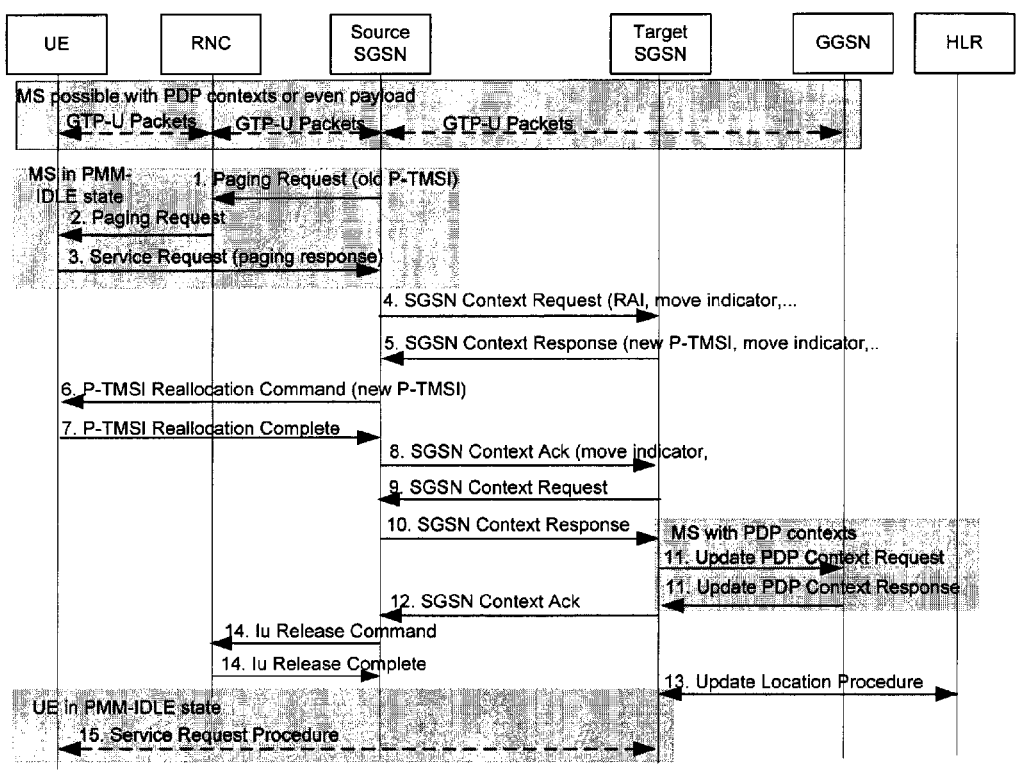
FIG. 2 shows a schematic message flow diagram for moving MS in SGSN pool by a SGSN context procedure in WCDMA according to an embodiment of the present invention.

FIG. 2 shows a schematic message flow diagram for moving MS in SGSN pool by a SGSN context procedure in WCDMA according to an embodiment of the present invention.

In the embodiment of the invention, a move operation procedure for moving an active subscriber from a source SGSN to a target SGSN for the WCDMA system will be described hereinafter. Simply, the target SGSN prepares to serve the MS to be moved from the source SGSN by assigning a new P-TMSI (Packet Temporary Mobile Subscriber Identity) when it is informed of the move operation. Then, the source SGSN transfers the MS mobility management (MM) context and the PDP contexts including a security context to the target SGSN after allocating the new P-TMSI to the MS. Thus, the target SGSN takes over the connection with the GGSN from the source SGSN and re-establishes the radio connection with the RNC, in this way, data packets may be communicated between the MS and the GGSN via the target SGSN instead of the original source SGSN.

In particular, the message flow shown in FIG. 2 for MS Move from the source SGSN to the target SGSN within the SGSN Pool by SGSN Context Procedure for WCDMA is as follows:

1. If a source SGSN decides to move an MS and MS is in PMM-IDLE state, it firstly pages this MS with an old P-TMSI (i.e. the old P-TMSI is allocated by the source SGSN) to RNC.

2. RNC will page the MS.

3. The MS responds with a Service Request (paging response) towards the source SGSN.

4. Source SGSN sends a "SGSN Context Request" (IMSI, RAI, Tunnel Endpoint Identifier Control Plane, SGSN Address for Control Plane, Private Extension including Move indicator) message towards a selected target SGSN. The legacy timer to wait for "SGSN Context Response" from the target SGSN is started.

5. Target SGSN validates the request with respect to roaming restrictions, load check etc. If the new MS can't be accepted, the request is rejected. Otherwise the MS is assigned a new P-TMSI and a SGSN Context Response (Cause="Request Accepted", Tunnel Endpoint Identifier Control Plane, SGSN address for control plane, Private Extension including move indicator, new P-TMSI and P-TMSI Signature) message is sent to the source SGSN.

6. Source SGSN sends a P-TMSI Reallocation Command message with the new assigned P-TMSI to the MS.

7. MS responds with a P-TMSI Reallocation Complete message towards the source SGSN. Now the MS has a new P-TMSI including an NRI pointing to the target SGSN, but signalling will still be directed towards the source SGSN as long as the current Iu connection remains. After receiving the P-TMSI Reallocation Complete message from the MS, the source SGSN will consider the old P-TMSI and old RAI as invalid.

8. Source SGSN sends a "SGSN Context Ack" message to the target SGSN.

9. Target SGSN sends an "SGSN Context Request" message (new P-TMSI, RAI, new P-TMSI Signature) to the source SGSN to get a mobility management (MM) and PDP contexts for the MS.

10. Source SGSN responds with an "SGSN Context Response" (MM Context, PDP Contexts) message.

11. For each PDP context, the target SGSN sends an "Update PDP Context Request" message to the GGSN in which the user-plane IP address and TEID value of the SGSN will be sent to the GGSN. In the message "Update PDP Context Request", Common Flags IE shall be included with "No QoS Negotiation" bit set to 1. The GGSN updates the PDP context fields and returns an "Update PDP Context Response" message to the target SGSN.

12. Target SGSN sends an "SGSN Context Acknowledge" message to the source SGSN.

13. Target SGSN informs the HLR of the change of SGSN to initiate an Update Location procedure to the HLR.

14. In order to setup the radio link connection with target SGSN and RNC as soon as possible if there is data transferring, so once received "SGSN Context Ack", source SGSN shall release the Iu connection and RAB by sending an Iu Release Command message to the RNC. The RNC confirms the Iu release by returning an Iu Release Complete message to the SGSN.

15. From this point the downlink packets from GGSN will be directed towards the target SGSN and the uplink will go to the target SGSN since the new P-TMSI is already sent to the MS. A successive Service Request procedure will launch to transfer the uplink packet data from UE or the target SGSN will page the UE using the RAI transferred from the source SGSN.

Figure 3:
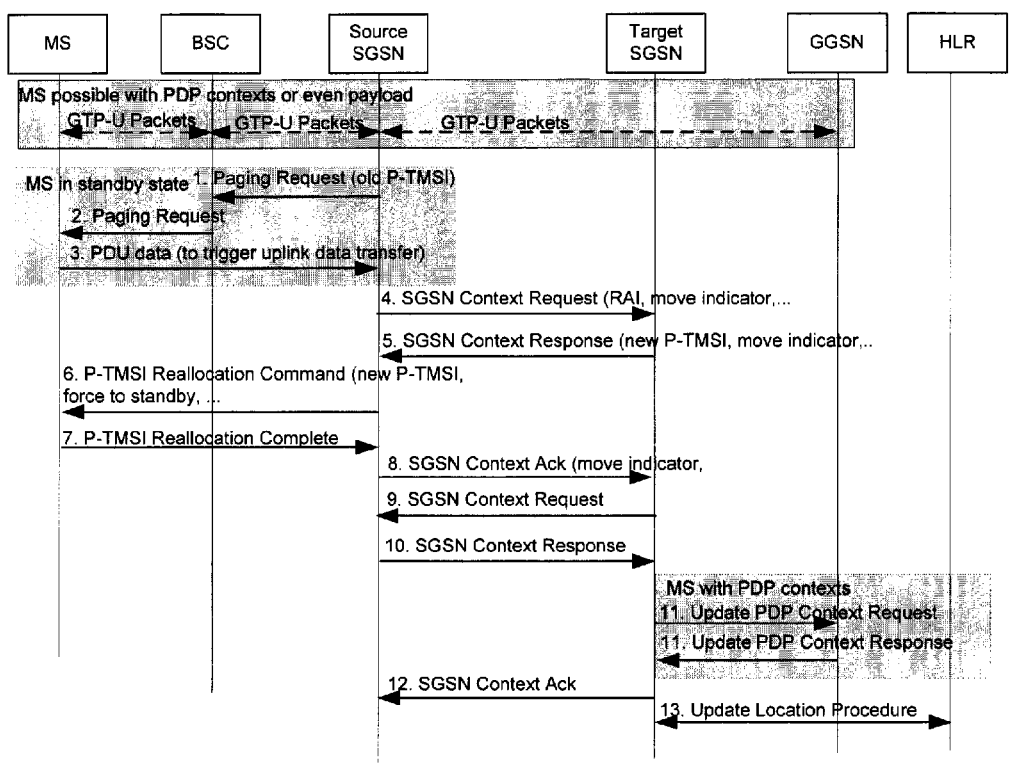
FIG. 3 shows a schematic message flow diagram for moving MS in SGSN pool by a SGSN context procedure in GSM according to an embodiment of the present invention.

FIG. 3 shows a schematic message flow diagram for moving MS in SGSN pool by a SGSN context procedure in GSM according to an embodiment of the present invention.

The message flow for GSM system shown in FIG. 3 is similar as the one for WCDMA system shown in FIG. 2 except that, in this embodiment for GSM, in the message with a sequence No. 6 when the source SGSN sends "P-TMSI Reallocation Command" to MS, the Information Element (IE) "force to standby" shall be set to true. From this point, the radio link to source SGSN will be released after P-TMSI reallocation procedure. Description of other messages for GSM system will be omitted herein for simplicity.

Figure 4:
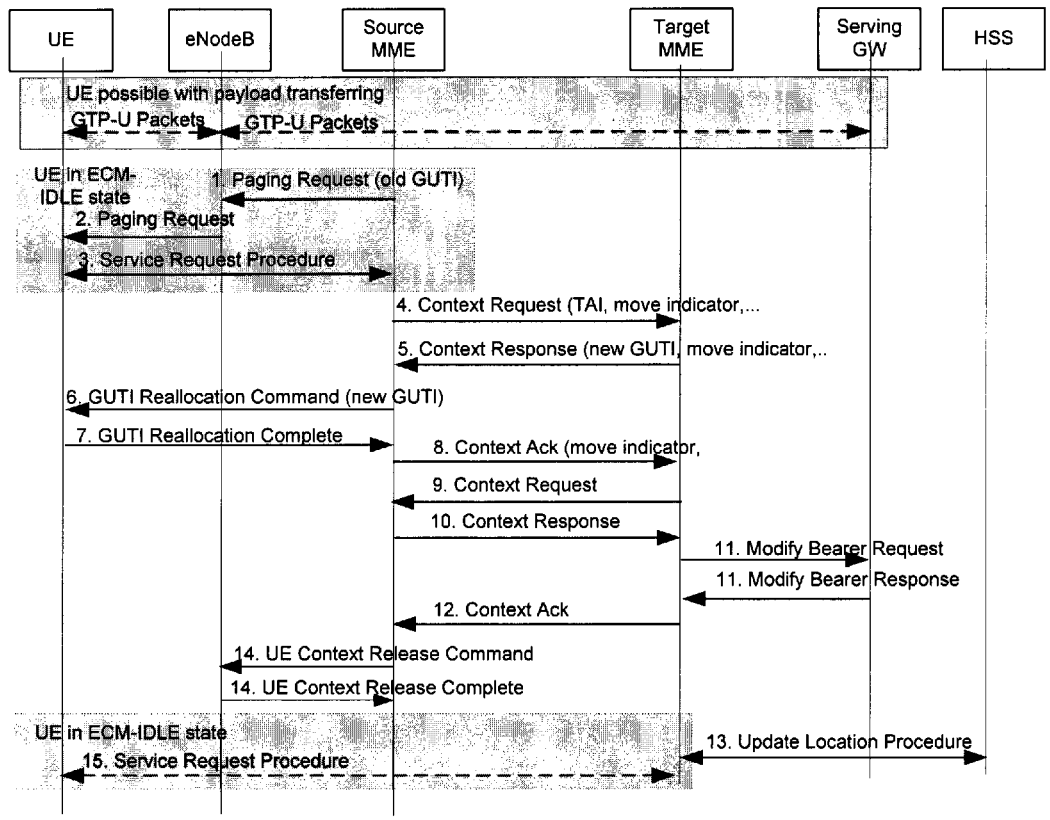
FIG. 4 shows a schematic message flow diagram for moving UE in SGSN pool by a SGSN context procedure in WCDMA according to an embodiment of the present invention.

FIG. 4 shows a schematic message flow diagram for moving UE in SGSN pool by a SGSN context procedure in WCDMA according to an embodiment of the present invention.

In the embodiment of the invention, UE move from a source MME to a target MME for the LTE system will be described hereinafter. Simply, the target MME prepares to serve the UE to be moved from the source MME by assigning a new GUTI (Globally Unique Temporary Identity) when it is informed of the move operation of UE. The source MME transfers the UE MM context and the EPS bearer contexts including security context to the target MME after allocating the new GUTI to the UE. Then, the target MME takes over the connection with S-GW from the source MME and re-establishes the radio connection with eNodeB.

In particular, a message flow shown in FIG. 4 for UE Move in MME Pool by MME context procedure for the LTE system will be described as follows.

1. If the source MME decides to move an UE and UE is in ECM-IDLE state, it firstly pages this UE with an old GUTI (i.e. the GUTI is allocated by the source MME) to eNodeB.

2. eNodeB will page the UE.

3. The UE responds with a Service Request towards the source MME.

4. Source MME sends a "Context Request (IMSI, Complete TAU Request Message, TAI, Private Extension including Move indicator)" message towards a selected target MME. The GTP N3/T3 timer to wait for "Context Response" from the target MME is started.

5. Target MME validates the request with respect to roaming restrictions, load check etc. If the new UE can't be accepted, the request is rejected. Otherwise the UE is assigned a new GUTI and a Context Response (Cause="Request Accepted", address for control plane, Private Extension including move indicator, new GUTI) message is sent to the source MME.

6. Source MME sends a "GUTI Reallocation Command" message with the new assigned GUTI to the UE.

7. UE responds with a "GUTI Reallocation Complete" message towards the source MME. Now the UE has a new GUTI including a GUMMEI pointing to the target MME, but signalling will still be directed towards the source MME as long as the current radio connection remains. After receiving the GUTI Reallocation Complete message from the UE, the source MME will consider the old GUTI and old Tracking Area Identity (TAI) as invalid.

8. Source MME sends a "Context Ack" message to the target MME.

9. Target MME sends a "Context Request" message (new GUTI) to the source MME to get the MM context and EPS bearer contexts for the UE.

10. Source MME responds with a "Context Response" (MM Context, EPS bearer Contexts) message.

11. For each EPS bearer Context, the target MME sends a "Modify Bearer Request" message to the S-GW in which the user-plane IP address and TEID value of the MME will be sent to the GGSN. The S-GW updates the EPS bearer context fields and returns a "Modify Bearer Response" message to the target MME.

12. Target MME sends a "Context Acknowledge" message to the source MME.

13. Target MME informs the HSS of the change of MME to initiate an Update Location procedure to the HSS.

14. In order to setup the radio link connection between the target MME and eNodeB as soon as possible if there is data transferring, so once received "Context Ack" message, the source MME shall release the radio connection by sending an "UE Context Release Command" message to the eNodeB. The eNodeB confirms the release by returning an "UE Context Release Complete" message to the MME.

15. A successive Service Request procedure will launch to transfer the uplink packet data from UE or the target MME will page the UE using the TAI transferred from the source MME.

Figure 5:
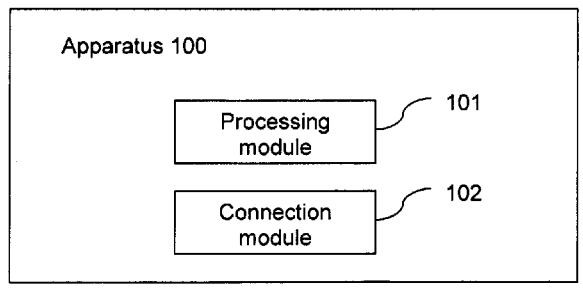
FIG. 5 shows a schematic diagram for an apparatus moving a wireless terminal in a mobility management serving node pool according to an embodiment of the present invention.

FIG. 5 shows a schematic diagram for an apparatus 100 moving a wireless terminal in a mobility management serving node pool according to an embodiment of the present invention. The components related in the apparatus are illustrated in connection with the reference signs in FIG. 6.

In the embodiment of the invention, a computer-implemented apparatus 100 for moving a wireless terminal 201 (e.g., UE/MS) in a mobility management serving node pool 206 (e.g., SGSN pool/MME pool) is provided. The mobility management serving node pool 206 includes at least a source mobility management serving node 203 (e.g., source SGSN/MME) and a target mobility management serving node 204 (e.g., target SGSN/MME).

The apparatus 100 includes a processing module 101 and a connection module 102. The processing module 101 is configured to initiate, from the source mobility management serving node 203 (e.g., source SGSN/MME), a first subscriber context procedure to inform the target mobility management serving node 204 (e.g., target SGSN/MME) of a move action for the wireless terminal 201 (e.g., MS/UE), and to launch, from the target mobility management serving node 204 (e.g., target SGSN/MME), a second subscriber context procedure to the source mobility management serving node 203 (e.g., source SGSN/MME) to obtain a subscriber context for the wireless terminal 201 (e.g., UE/MS), in response to the informing. The connection module 102 is configured to establish a connection between a radio access node 202 (e.g., RNC/BSC/eNodeB) for the wireless terminal 201 (e.g., UE/MS) and a session management gateway node 205 (e.g., GGSN/S-GW, P-GW) via the target mobility management serving node 204 (e.g., target SGSN/MME).

In an embodiment, in the first subscriber context procedure, the processing module is 101 further configured to send a request containing at least a move indicator, a subscriber permanent identity, and a serving radio access node identity or location information from the source mobility management serving node 203 (e.g., source SGSN/MME) to the target mobility management serving node 204 (e.g., target SGSN/MME); to receive a response containing at least a new subscriber temporary identity (e.g., P-TMSI/GUTI) assigned for the wireless terminal 201 (e.g., MS/UE) to be moved and the move indicator from the target mobility management serving node 204 (e.g., target SGSN/MME), and to return an Acknowledgement containing the move indicator to the target mobility management serving node 204 (e.g., target SGSN/MME).

In the embodiment, before returning the Acknowledgement, the processing module 101 is further configured to allocate, by the source mobility management serving node 203 (e.g., source SGSN/MME), the new subscriber temporary identity (e.g., P-TMSI/GUTI) to the wireless terminal 201 (e.g., MS/UE); and to receive, by the source mobility management serving node 203 (e.g., source SGSN/MME), a response indicating the new subscriber temporary identity allocation completes from the wireless terminal 201 (e.g., MS/UE).

In another embodiment, the processing module is 101 further configured to, in the second subscriber context procedure, send a request for the subscriber context (e.g., SGSN context/MME context) from the target mobility management serving node 204 (e.g., target SGSN/MME) to the source mobility management serving node 203 (e.g., source SGSN/MME); to transfer the subscriber context containing mobility management context, and session management context if existing, for the wireless terminal 201 (e.g., MS/UE) from the source mobility management serving node 203 (e.g., source SGSN/MME) to the target mobility management serving node 204 (e.g., target SGSN/MME); and to return an Acknowledgement to the source mobility management serving node 203 (e.g., source SGSN/MME).

In the embodiment, before returning the Acknowledgement, if session management context existing, the processing module 101 is further configured to send a request for updating the session management context from the target mobility management serving node 204 (e.g., target SGSN/MME) to the session management gateway node 205 (e.g., GGSN/S-GW, P-GW); and to receive a response indicating completion of the update from the session management gateway node 205 (e.g., GGSN/S-GW, P-GW).

Figure 6:
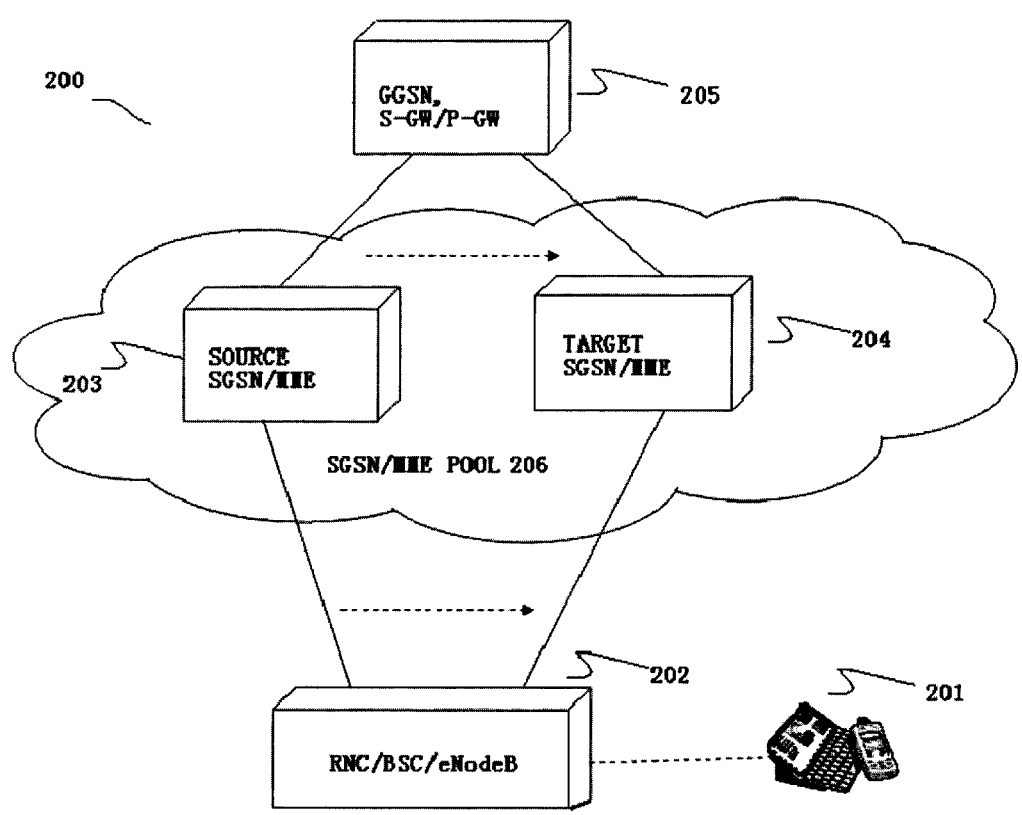
FIG. 6 shows a schematic diagram for a system moving a wireless terminal in a mobility management serving node pool according to an embodiment of the present invention.

FIG. 6 shows a schematic diagram for a system 200 moving a wireless terminal 201 (e.g., MS/UE) in a mobility management serving node pool 206 (e.g., SGSN pool/MME pool) according to an embodiment of the present invention.

The system 200 includes the wireless terminal 201; a radio access node 202 (e.g., RNC/BSC/eNodeB) for connecting the wireless terminal 201 (e.g., MS/UE) to the mobility management serving node pool 206; the source mobility management serving node 203 (e.g., source SGSN/MME) for initiating a first subscriber context procedure to inform the target mobility management serving node 204 (e.g., target SGSN/MME) of a move action for the wireless terminal 201 (e.g., MS/UE);

the target mobility management serving node 204 (e.g., target SGSN/MME) for launching a second subscriber context procedure to the source mobility management serving node 203 (e.g., source SGSN/MME) for requesting for mobility management context and session management context(s) (e.g., PDP contexts/EPS bearer contexts) if exists, in response to the informing; and a session management gateway node 205 (e.g., GGSN/S-GW, P-GW) for providing packet data connection as the gateway for the wireless terminal 201 (e.g., MS/UE).

In an embodiment, the source mobility management serving node 203 (e.g., source SGSN/MME) is further configured to send a request containing at least a move indicator, a subscriber permanent identity and a serving radio access node identity (or the location information) to the target mobility management serving node 204 (e.g., target SGSN/MME); to receive a response containing at least a new subscriber temporary identity (e.g., P-TMSI/GUTI) assigned for the wireless terminal 201 (e.g., MS/UE) to be moved and the move indicator from the target mobility management serving node 204 (e.g., target SGSN/MME), and to return an Acknowledgement containing at least the move indicator to the target mobility management serving node 204 (e.g., target SGSN/MME).

In the embodiment, before returning the Acknowledgement, the source mobility management serving node 203 (e.g., source SGSN/MME) is further configured to allocate the new subscriber temporary identity (e.g., P-TMSI/GUTI) to the wireless terminal 201 (e.g., MS/UE); and to receive a response indicating the new subscriber temporary identity allocation completes from the wireless terminal 201 (e.g., MS/UE).

In an embodiment, the target mobility management serving node 204 (e.g., target SGSN/MME) is further configured to send a request for the subscriber context to the source mobility management serving node 203 (e.g., source SGSN/MME); to receive the subscriber context containing mobility management context and session management context (e.g., PDP contexts/EPS bearer contexts) if existing, for the wireless terminal 201 (e.g., MS/UE) from the source mobility management serving node 203 (e.g., source SGSN/MME); and to return an Acknowledgement to the source mobility management serving node 203 (e.g., source SGSN/MME).

It is to be noted that the features set forth in the methods of the embodiments may correspondingly be applied to the apparatuses or systems of the invention. Thus, herein other similar features will not be described again.

Furthermore, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Further, it is to be noted that, the order of features/steps in the claims or in the description do not imply any specific order in which the features/steps must be worked. Rather, the steps/features may be performed in any suitable order.

The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and/or functionally distributed between different units and processors.

The terminology used herein is for the purpose of describing particular embodiments only and is not intended to limit to the invention. As used herein, the singular forms "a", "an" and "the" are intended to comprise the plural forms as well, unless otherwise stated. It will be further understood that the terms "comprising", "comprising" and conjugation thereof when used herein, specify the presence of stated features, integers, steps, operations, elements, and/or components, but do not preclude the presence or addition of one or more other features, integers, steps, operations, elements, components, and/or groups thereof.

Although the invention has been particularly shown and described with reference to exemplary embodiments thereof, it will be understood by those skilled in the art that various changes in form and details may be made without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims.

The invention claimed is:

1. A method for moving a wireless terminal in a mobility management serving node pool comprising a source mobility management serving node and a target mobility management serving node, the method comprising:
   initiating, from the source mobility management serving node, a first subscriber context procedure to inform the target mobility management serving node of a move action for the wireless terminal, the first subscriber context procedure including (i) sending a first request including at least a move indicator, and (ii) receiving, in response to the first request from the target mobility management node, a first response containing at least a new subscriber temporary identity assigned from the wireless terminal to be moved and the move indicator from the target mobility management serving node;
   launching, from the target mobility management serving node in response to the informing and after the first subscriber procedure is completed, a second subscriber context procedure to obtain a subscriber context for the wireless terminal from the source mobility management serving node, the second subscriber context procedure including:
      (i) sending a second request for the subscriber context from the target mobility management serving node to the source mobility management serving node; (ii) transferring the subscriber context containing mobility management context, and session management context if existing, for the wireless terminal from the source mobility management serving node to the target mobility management serving node; and (iii) returning an acknowledgment to the source mobility management serving node; and
   establishing a connection between a radio access node for the wireless terminal and a session management gateway node via the target mobility management serving node.

2. The method according to claim 1, wherein
the first request further includes a subscriber permanent identity, and a serving radio access node identity or location information from the source mobility management serving node to the target mobility management serving node, wherein the first subscriber context procedure further comprises:

returning a first Acknowledgement containing at least the move indicator to the target mobility management serving node.

3. The method according to claim 2, before returning the first Acknowledgement, further comprising:
allocating, by the source mobility management serving node, the new subscriber temporary identity to the wireless terminal; and
receiving, by the source mobility management serving node, a response indicating that the new subscriber temporary identity allocation completes from the wireless terminal.

4. The method according to claim 2, wherein
the acknowledgment returned to the source mobility management serving node during the second subscriber context procedure is a second Acknowledgement.

5. The method according to claim 4, before returning the second Acknowledgement, further comprising if session management context existing:
sending a request for updating the session management context from the target mobility management serving node to the session management gateway node; and
receiving a response indicating completion of the update from the session management gateway node.

6. The method according to claim 4, further comprising:
initiating, by the target mobility management serving node, an update location procedure to notify HLR/HSS the wireless terminal moved from the source mobility management serving node to the target mobility management serving node.

7. The method according to claim 5, further comprising:
for WCDMA system and LTE system, releasing radio connection between the source mobility management serving node and the radio access node.

8. The method according to claim 1, wherein the radio access node holds only one radio link from the wireless terminal to be moved either to the source mobility management serving node or to the target mobility management serving node at the same time.

9. The method according to claim 1, wherein for WCDMA system and GSM system, the mobility management serving node pool is a SGSN pool, the source mobility management serving node and the target mobility management serving node are respectively a source SGSN node and a target SGSN node, the radio access node is a RNC/BSC node, and the session management gateway node is a GGSN node.

10. The method according to claim 1, wherein for LTE system, the mobility management serving node pool is a MME pool, the source mobility management serving node is a source MME node, the target mobility management serving node is a target MME node, and the session management gateway node is a S-GW/P-GW node.

11. A non-transitory computer readable medium having instructions stored therein, which when executed by a computer-implemented apparatus for moving a wireless terminal in a mobility management serving node pool comprising a source mobility management serving node and a target mobility management serving node causes the apparatus to execute a method comprising:
initiating, from the source mobility management serving node, a first subscriber context procedure to inform the target mobility management serving node of a move action for the wireless terminal, the first subscriber context procedure including (i) sending a first request including at least a move indicator, and (ii) receiving, in response to the first request from the target mobility management node, a first response containing at least a new subscriber temporary identity assigned from the wireless terminal to be moved and the move indicator from the target mobility management serving node;
launching, from the target mobility management serving node in response to the informing and after the first subscriber procedure is completed, a second subscriber context procedure to obtain a subscriber context for the wireless terminal from the source mobility management serving node, the second subscriber context procedure including:
(i) sending a second request for the subscriber context from the target mobility management serving node to the source mobility management serving node; (ii) transferring the subscriber context containing mobility management context, and session management context if existing, for the wireless terminal from the source mobility management serving node to the target mobility management serving node; and (iii) returning an acknowledgment to the source mobility management serving node; and
establishing a connection between a radio access node for the wireless terminal and a session management gateway node via the target mobility management serving node.

12. The non-transitory computer readable medium according to claim 11, wherein
the first request further includes a subscriber permanent identity, and a serving radio access node identity or location information from the source mobility management serving node to the target mobility management serving node, wherein the first subscriber context procedure further comprises:
returning a first Acknowledgement containing at least the move indicator to the target mobility management serving node.

13. The non-transitory computer readable medium according to claim 12, before returning the first Acknowledgement, the method further comprises:
allocating, by the source mobility management serving node, the new subscriber temporary identity to the wireless terminal; and
receiving, by the source mobility management serving node, a response indicating the new subscriber temporary identity allocation completes from the wireless terminal.

14. The non-transitory computer readable medium according to claim 12, wherein
the returned acknowledgment to the source mobility management serving node during the second subscriber context procedure is a second Acknowledgment.

15. The non-transitory computer readable medium according to claim 14, before returning the second Acknowledgement, if session management context existing, the method further comprises:
sending a request for updating the session management context from the target mobility management serving node to the session management gateway node; and
receiving a response indicating completion of the update from the session management gateway node.

16. The non-transitory computer readable medium according to claim 14, the method further comprises:
initiating, by the target mobility management serving node, an update location procedure to notify HLR/HSS the wireless terminal moved from the source mobility management serving node to the target mobility management serving node.

17. The non-transitory computer readable medium according to claim 15, the method further comprises:
for WCDMA system (and LTE system), release radio connection between the source mobility management serving node and the radio access node.

18. A system moving a wireless terminal in a mobility management serving node pool comprising a source mobility management serving node and a target mobility management serving node, the system comprising:
the wireless terminal;
a radio access node configured to connect the wireless terminal to the mobility management serving node pool;
the source mobility management serving node configured to initiate a first subscriber context procedure to inform the target mobility management serving node of a move action for the wireless terminal, the first subscriber context procedure including (i) sending a first request including at least a move indicator, and (ii) receiving, in response to the first request from the target mobility management node, a first response containing at least a new subscriber temporary identity assigned from the wireless terminal to be moved and the move indicator from the target mobility management serving node;
the target mobility management serving node configured to launch, in response to the informing and after the first subscriber procedure is completed, a second subscriber context procedure for requesting a mobility management context and session management context from the source mobility management serving node, the second subscriber context procedure including:
(i) sending a second request for the subscriber context from the target mobility management serving node to the source mobility management serving node; (ii) transferring the subscriber context containing mobility management context, and session management context if existing, for the wireless terminal from the source mobility management serving node to the target mobility management serving node; and (iii) returning an acknowledgment to the source mobility management serving node; and
a session management gateway node configured to provide a packet data connection as the gateway for the wireless terminal.

19. The system according to claim 18, wherein
the first request further includes a subscriber permanent identity, and a serving radio access node identity or location information to the target mobility management serving node, wherein the source mobility management serving node is further configured to, for the first subscriber context procedure:
return a first Acknowledgement containing at least the move indicator to the target mobility management serving node.

20. The system according to claim 19, before returning the first Acknowledgement, the source mobility management serving node is further configured to:
allocate the new subscriber temporary identity to the wireless terminal; and
receive a response indicating the new subscriber temporary identity allocation completes from the wireless terminal.

21. The system according to claim 19, wherein
the acknowledgment returned to the source mobility management serving node during the second subscriber context procedure is a second Acknowledgment.

22. The method according to claim 21, before returning the the second Acknowledgment, further comprising if the session management context is existing:
sending a request for updating the session management context from the target mobility management serving node to the session management gateway node; and
receiving a response indicating completion of the update from the session management gateway node.

23. The method according to claim 22, further comprising:
initiating, by the target mobility management serving node, an update location procedure to notify HLR/HSS the wireless terminal moved from the source mobility management serving node to the target mobility management serving node.

\* \* \* \* \*